Figure 1:
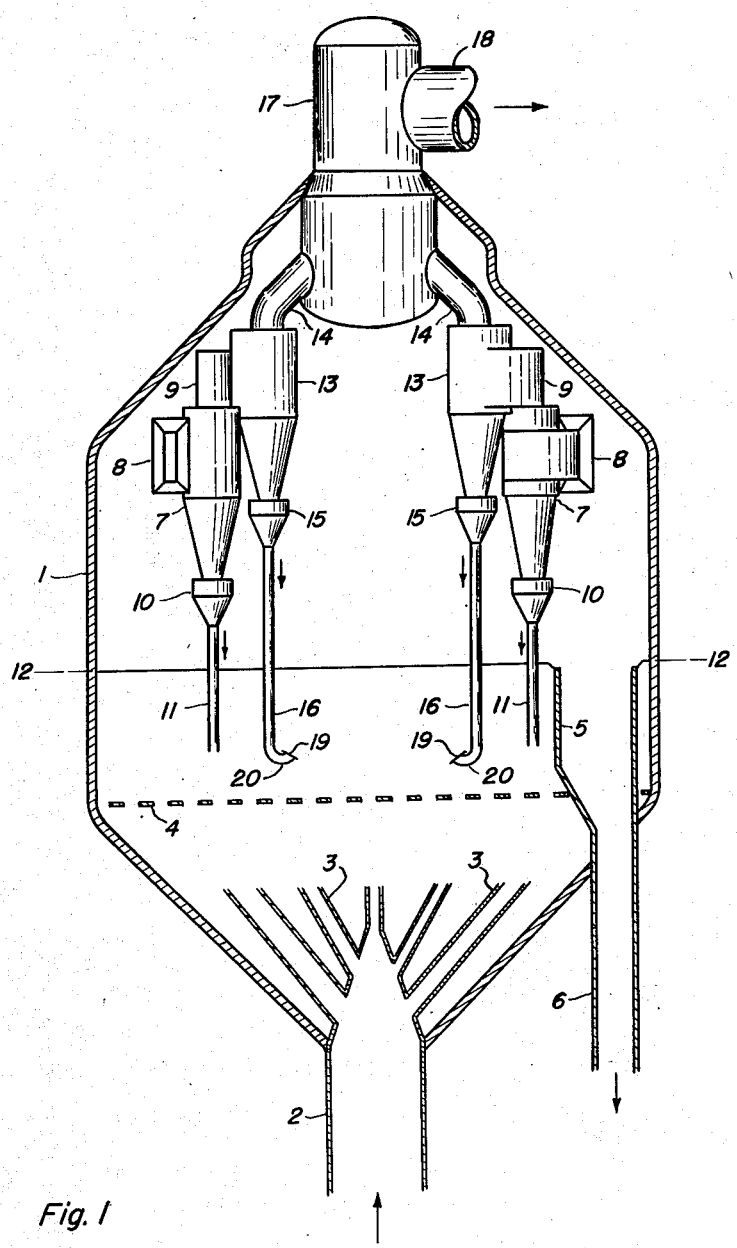

April 7, 1953   B. G. JONES   2,634,191
INITIAL SEALING OF CYCLONE DIP-LEGS
Filed Jan. 3, 1951   2 SHEETS—SHEET 1

INVENTOR.
BENJAMIN G. JONES
BY
Thomas G. Bell
AGENT

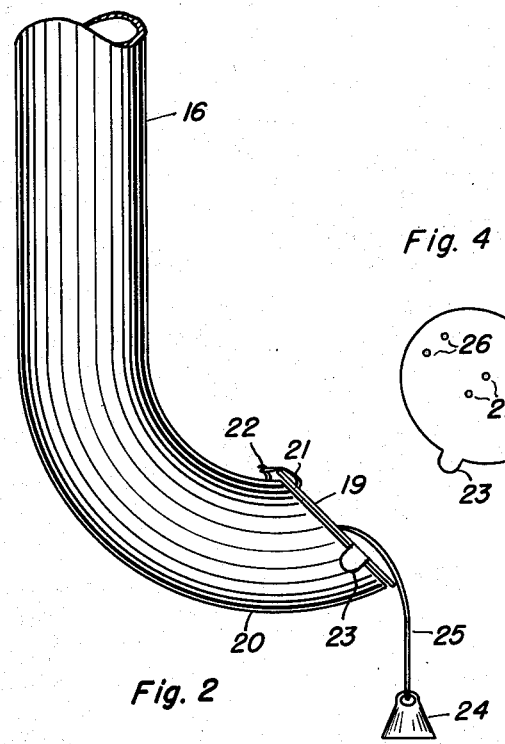
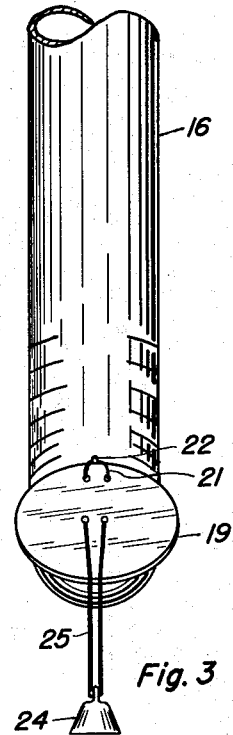
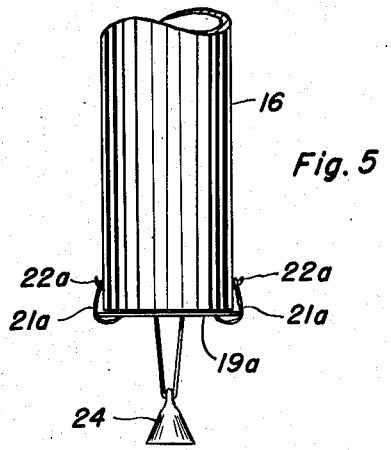
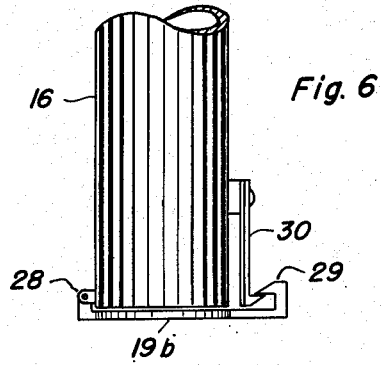
INVENTOR.
BENJAMIN G. JONES
BY Thomas G. Bell
AGENT Patented Apr. 7, 1953

2,634,191

UNITED STATES PATENT OFFICE 2,634,191

INITIAL SEALING OF CYCLONE DIP-LEGS

Benjamin G. Jones, Concord, Calif., assignor to Tide Water Associated Oil Company, San Francisco, Calif., a corporation of Delaware Application January 3, 1951, Serial No. 204,241

6 Claims. (Cl. 23—1)

This invention relates to contacting processes and apparatus of the so-called "fluid" type wherein gases are contacted with pulverized solids maintained in a fluidized bed by passage therethrough of gases under treatment. In particular, the invention has to do with the cyclone separators conventionally used in such processes to separate entrained solids from the effluent gases, and, in more particularity, with conditions prevailing during the starting-up of such processes when the solids return lines of the cyclones are not effectively sealed against reverse flow. Although the invention is particularly adapted for use in conjunction with the well known fluid catalytic cracking process, it is likewise useful with various other contacting operations utilizing the fluidized bed principle, as will be apparent from the following description.

In various operations requiring the contacting of gases with solids, especially catalytic operations at elevated temperatures, it is now common practice to use the so-called "fluid" principle wherein the gases are passed through a bed of powdered solids within a contacting vessel. The velocity of the gases through the contacting vessel is adjusted so as to maintain the solids in a mobile condition resembling a fluid. This mobile condition permits easy transfer of the contact material through pipes, into and out of the vessel or between vessels, such as between the reactor and regenerator of a fluid catalytic cracking plant.

To remove entrained solids from the gases leaving the contacting vessel, it is common practice to provide within the vessel one or more cyclone separators through which the gases are forced before being discharged from the vessel. Solids removed from the effluent gases by the cyclones are returned through a pipe to the fluid bed. This pipe, commonly called a "dip-leg," extends below the surface of the bed in order to provide a seal against gases which might otherwise be blown upwardly in the dip-leg and prevent proper action of the cyclone. Various arrangements of cyclones and dip-legs are in use. In some installations cyclones in multiple are used discharging solids into a common dip-leg. In others, cyclones in series, or series-parallel, are used with individual dip-legs.

However the arrangement, difficulties are commonly encountered when loading the vessel with contact material to the desired level preparatory to bringing the vessel on-stream. In starting up such vessels it is common to blow the powdered solids into the empty vessel (usually with a current of air, though other gases may be used). Until the level of solids within the vessel reaches the bottom of the dip-leg (or dip-legs, as the case may be) the air or other carrier gas is free to pass upwardly through the dip-leg and thus by-pass the normal flow through the cyclones. Under such conditions, excessive amounts of solids are carried out of the vessel with attendant loss of valuable material and/or choking up of subsequent apparatus. Although dampers, operated by distant control from outside the vessel, have been used to close the dip-legs during the filling operation, the controls have a tendency to jam, the control rods require packing glands in the vessel walls, and the dampers even when open create an undesirable restriction to the normal flow of solids in the dip-legs under operating conditions. Likewise U shaped traps have been added to the bottom of the dip-legs in an attempt to prevent reverse flow. In practice such U traps have unduly restricted normal flow of solids and have at times become completely plugged thereby destroying the operation of the cyclones.

The present invention provides a means whereby the dip-legs of the cyclones may be sealed during loading of the contact vessel and whereby the seal may be removed as completely as desired after the normal level of solids has been attained. Broadly, the invention comprises closing the dip-leg by a means adapted to release when operating temperatures are reached. The closure is placed on the dip-leg before the solids are introduced into the contact vessel. After an appropriate level of solids has been established in the vessel, the mass is heated to operating temperatures, thereby releasing the closure and establishing normal operation of the cyclone and dip-leg. The invention is especially suited for use in connection with the secondary and later stages of cyclones where two or more cyclones are placed in series. Due to the pressure differential between the stages and the fact that the later stages separate lesser quantities of solids, it is important that the dip-leg of at least the last stage be closed until it can be properly sealed by normal bed level. The preferred closure contemplated by the invention is a metal plate held across the outlet of the dip-leg by a fusible link whose melting point is at, or somewhat below, normal operating temperatures. However, other suitable releasing means may suggest themselves to the engineer, such as for example, a bi-metallic thermostatic latch, or the seal itself may be composed either partly or wholly of material which will fuse or otherwise rupture or disintegrate at the desired temperature.

The invention may be more fully understood by reference to the drawings, Figure 1 of which illustrates partly in section the regenerator of a fluid catalytic cracking plant adapted to use the invention. Figures 2 and 3 are elevation views of the lower end of a cyclone dip-leg equipped with closure plate and fusible link in accordance with a preferred form of the invention. Figure 4 is a detail of the closure plate of Figures 2 and 3. Figure 5 is an elevation view of the lower end of a dip-leg equipped with an alternate form of closure plate and fusible links. Figure 6 is an elevation view of a closure plate and thermostatic latch applied to the lower end of a dip-leg in accordance with another species of the invention.

Referring to Figure 1, there are illustrated, in section, regenerator vessel 1, riser or inlet 2, terminating in distribution spider 3 at some distance above which is located distribution grid 4, catalyst return hopper 5, and standpipe or catalyst outlet 6 of a typical catalytic cracking plant. Within regenerator 1 are located primary cyclones 7 provided with flue-gas inlet horns 8, gas outlets 9, vortex breakers 10, and catalyst return dip-legs 11 extending downward to a point substantially below the normal catalyst level 12. Outlets 9 are connected to the inlets of secondary cyclones 13 similarly provided with gas outlets 14, vortex breakers 15, and dip-legs 16. Outlets 14 enter manifold 17 to which is connected flue gas line 18. For convenience of illustration only two sets of primary and secondary cyclones are shown, though it is common to employ several sets arranged symmetrically about the vertical axis of the regenerator.

During normal operation of the unit, dip-legs 11 and 16 are open at their lower ends to permit return of catalyst from the cyclones to the fluid bed. In Figure 1, dip-legs 16 of secondary cyclones 13 are shown closed by plates 19 to illustrate the situation occurring according to the invention when catalyst is being introduced into regenerator 1 when starting up the plant. Primary dip-legs 11 may, if desired, be similarly closed, though such is not generally necessary, it being found sufficient to close only the last dip-leg of each series. Dip-legs 16 may advantageously terminate in a bend 20 as shown. A similar bend may, if desired, be added to the bottom of dip-legs 11.

As is well known, in normal operation of a regenerator such as depicted in Figure 1, spent catalyst from the catalytic cracker reactor is introduced into regenerator 1 through riser 2 by means of a current of air supplied to the reactor for the purpose of burning off carbonaceous deposits from the spent catalyst. The main body of the thus introduced catalyst assumes the form of a fluid bed through which the air bubbles thereby providing the desired combustion. In due time, as the bed level rises above the line 12, regenerated catalyst overflows into hopper 5 and flows down through standpipe 6 to be injected into the cracker reactor. After passing through the catalyst bed, the air, now more accurately designated as flue gas, passes upwardly laden with entrained catalyst. The thus laden flue gas enters primary cyclones 7 through inlets 8 wherein, due to centrifugal action, a large part of the entrained catalyst is separated and returns by gravity through vortex breakers 10 and dip-legs 11. The flue gas, still containing a substantial amount of catalyst fines, then enters secondary cyclones 13, where, by similar action, a large percentage of the fines is removed and returned to the bed through dip-legs 16. The effluent flue-gas leaves the regenerator through manifold 17 and line 18.

It will be apparent from the above résumé of the normal conditions that the proper functioning of the cyclones depends upon a proper head of catalyst being present at all times in dip-legs 11 and 16. This in turn is accomplished by extending the dip-leg below the surface of the catalyst bed. It will also be apparent that, when catalyst is first being introduced into the regenerator in preparation to starting up the cracking plant, the outlets of the dip-legs will be above the catalyst bed and the catalyst laden air will be free to pass upwardly through dip-legs 11 and, especially, through secondary dip-legs 16 unless prevented by additional means.

Illustrative of the invention, dip-legs 16 are closed with plates 19, shown in more detail in Figures 2, 3, and 4, during the catalyst filling period. Plate 19 is held in place by a fusible wire link 21 which passes around pin 22 welded to pipe 16. Ears 23 of plate 19 are bent against pipe 16 to provide additional rigidity. To assure positive removal of plate 19 from pipe 16 upon fusion of wire link 21, weight 24 may be attached to plate 19 in any suitable manner such as shown by wire 25. If desired, plate 19 may be provided with holes 23 for attaching fuse wire 21 and with holes 27 for attaching weight wire 24. For a catalytic cracking generator, fuse link 21 may conveniently have a fusing temperature of about 1000° F., although any fusing temperature below the normal operating temperature of the regenerator may be used. It is desirable to terminate dip-leg 16 with a bend 20 to act as a baffle against bubbles of air rising through the catalyst bed, though other baffling means may be used.

Starting up of apparatus in accordance with the invention may be readily understood from the following example: A catalytic cracker regenerator such as illustrated in Figure 1 was equipped with dip-leg seal plates as described above with reference to Figures 1, 2, 3, and 4. The fuse link wires 21 were selected from material having a fusing point of about 1000° F. When everything was in readiness, air heated to a temperature between 800° F. and 900° F. was passed through the regenerator, entering through riser 2 and leaving through manifold 17, stand-pipe 6 being closed by a valve. When the apparatus had thus been warmed up to about 800° F., catalyst was introduced into the air entering through riser 2. The bulk of the thus introduced catalyst, due to the reduction of the velocity of the air through regenerator 1, settled to the bottom of the regenerator and gradually built up a bed of the catalyst. A minor, though substantial, amount of the catalyst was carried by entrainment in the air, which unable to enter dip-legs 16 because of seal plates 19 entered secondary cyclones 13 either through dip-legs 11 or inlet horns 8. Soon sufficient of the coarser entrained catalyst separated in cyclones 7 to establish satisfactory operation of dip-legs 11 even though lacking a catalyst seal at their bottom. Accordingly, only much smaller amounts of catalyst remained suspended in the air leaving primary cyclones 7 through outlets 9 and entering secondary cyclones 13. During this stage, catalyst fines separated by secondary cyclones 13 gradually built up a head of catalyst in dip-legs 16. When the catalyst bed in regenerator 1 reached a desired level 12 the excess overflowed into hopper 5 and built up a desired head in stand-pipe 6. When proper level of catalyst was established, additional heat was supplied by introduction of oil fuel into regenerator 1 by nozzles (not shown in the drawing). When the temperature reached about 1000° F. the fuse links 21 ruptured permitting weights 24 to disengage plates 19 thereby establishing normal operation of secondary cyclones 13 and dip-legs 16. From this point on, conventional procedure was followed until the unit was functioning under normal operating conditions.

From the foregoing it will be readily apparent that seal plates 19 may be fashioned in various forms, two alternate forms being illustrated in Figures 5 and 6. In Figure 5, the lower end of dip-leg 16 is straight and the opening is sealed by a circular plate 19a, held in place by a plurality of fuse links 21a attached to pins 22a. A weight 24 may be added, if desired, for similar purposes as in Figure 2.

In Figure 6 closure plate 19b is constructed of heavy metal and is attached at one side to dip-leg 16 by hinge 28. Opposite to hinge 28 is provided pawl 29 engaging a pawl on bi-metallic thermostatic element 30 which, in turn, is attached to pipe 16. In operation, element 30 bends inwardly with increasing temperature until, at the desired temperature, the two pawls disengage permitting plate 19b to fall to open position.

In practice it is not necessary that seal plates 19 (19a or 19b) form an absolutely tight seal across the opening of dip-legs 16, it being necessary only to produce a sufficient obstruction against the up-flow of gases in dip-legs 16 to force the main body of gases through the cyclones 13 in the proper direction and to prevent separated solids from being blown upwardly out of dip-legs 16. In fact, it has been found to be advantageous for the seal-plates to fit loosely enough that separated solids in dip-legs 16, after a substantial head of such solids has been built up, can sift out between the plates 19 and the end of dip-legs 16. Under such conditions, any gases which may enter the bottom of dip-legs 16 will serve to aerate the solids within the dip-legs and tend to prevent their becoming packed.

While the invention has been described above in particular relationship to the bringing on-stream of a fluid catalytic cracker regenerator, it will be readily understood that a similar problem exists in starting up the reactor of the cracker when such reactor is equipped, as is common, with cyclone separators, and that the problem can be resolved in a similar manner by the use of seal plates across the dip-legs of the cyclones. In this case, however, since the normal operating temperature of the reactor is lower than that of the regenerator, a correspondingly lower fusing temperature of the fuse links is indicated. Likewise, various other processes using the fluidized bed for contacting gases with solids employ analogous equipment, though operating temperatures may vary depending upon the reactions desired. The invention may be adapted to such processes by selecting fuse links of appropriate rupture temperatures and conducting the initial filling of the contact vessel below such rupture temperature.

I claim:

1. In combination with the dip-leg of a cyclone separator in a contact vessel adapted to contact gases with a fluidized bed of powdered contact material, a closure for the lower end of said dip-leg movable under the influence of gravity, when not restrained, to open said lower end of said dip-leg and means normally restraining said closure from such movement; said means being automatically rendered inoperative to effect such restraining in response to an increase in temperature to above a predetermined minimum.

2. The combination of claim 1 wherein the means normally restraining the closure from movement is a thermostatic latch adjusted to release said closure at the predetermined temperature.

3. The combination of claim 1 wherein the means normally restraining the closure from movement comprises an element fusible at the predetermined temperature to render said means inoperative.

4. The combination of claim 3 wherein the element consists primarily of a fusible link at least partially supporting the closure.

5. The combination of claim 3 wherein the element is an integral part of the closure.

6. In the operation of a catalytic contact vessel adapted to contact at an elevated temperature a stream of gas with powdered contact material normally maintained within said vessel in a dense fluid phase and equipped with a cyclone separator for separating entrained contact material from exit gas and a dip-leg extending from said separator to a point below the upper level of said dense phase for returning separated contact material to said dense phase, the method of initially introducing said contact material into said vessel which comprises: closing the lower end of said dip-leg with a closure assembly containing temperature responsive means effective automatically to open said dip-leg at temperatures in excess of a predetermined minimum, introducing contact material into said vessel at a temperature below said predetermined temperature, maintaining the bulk of introduced contact material in dense fluid phase by passing a stream of gas therethrough, and after the level of said phase has reached the lower end of said dip-leg applying sufficient heat to said contact material to cause said temperature responsive means to open said dip-leg.

BENJAMIN G. JONES.

REFERENCES CITED

The following references are of record in the file of this patent:

UNITED STATES PATENTS

| Number | Name | Date |
| --- | --- | --- |
| 1,308,005 | Fesler | June 24, 1919 |
| 2,145,925 | Geisel | Feb. 7, 1939 |
| 2,378,607 | Watts | June 19, 1945 |
| 2,425,807 | Jahnig | Aug. 19, 1947 |
| 2,488,031 | Gunness | Nov. 15, 1949 |